United States Patent [19]

Richards

[11] Patent Number: 4,566,007

[45] Date of Patent: Jan. 21, 1986

[54] REARRANGEABLE MULTICONNECTION SWITCHING NETWORKS

[75] Inventor: Gaylord W. Richards, Naperville, Ill.

[73] Assignee: AT&T Bell Laboratories, Murray Hill, N.J.

[21] Appl. No.: 494,901

[22] Filed: May 16, 1983

[51] Int. Cl.⁴ .......................... H04Q 3/62; H04M 3/00
[52] U.S. Cl. ............................ 340/825.8; 340/825.79; 179/18 GF; 179/18 GE; 179/18 EA
[58] Field of Search ................................ 307/113, 115; 340/825.79, 825.8, 825.03; 179/18 GF, 18 GE, 18 EA; 370/63, 64

[56] References Cited

U.S. PATENT DOCUMENTS 3,129,407  4/1964  Paull .................................... 340/147
4,038,638  7/1977  Hwang ................................. 340/166

OTHER PUBLICATIONS

"A Study of Non-Blocking Switching Networks," C. Clos, *Bell System Technical Journal*, Mar. 1953, pp. 406-424.

"Three-Stage Multiconnection Networks which are Non-Blocking in the Wide-Sense," F. K. Hwang, *Bell System Technical Journal*, vol. 58, No. 10, Dec. 1979, pp. 2183-2187.

"On Rearrangeable Three-Stage Connecting Networks," V. E. Benes, *Bell System Technical Journal*, vol. 41, No. 5, Sep. 1962, pp. 1481-1492.

*Primary Examiner*—Donald J. Yusko
*Assistant Examiner*—Sharon L. Hodgkins
*Attorney, Agent, or Firm*—Frederick W. Padden; Ross T. Watland

[57] ABSTRACT

A two-stage, rearrangeable multiconnection switching network for connecting $N_1$ input channels to $n_2$ output channels. The network comprises a number of first stage switches and a second stage switch, e.g., rectangular arrays. The second stage switch has $n_2$ outlets each connected to one of the $n_2$ output channels. A connection arrangement connects each of the first stage switch inlets to an associated predetermined input channel such that for any group of $n_2$ of the input channels, there is a group of $n_2$ of the first stage switches each having one inlet connected to a different one of that group of $n_2$ of the input channels. The approach is easily extendible to switching networks serving any larger number, $N_2$, of output channels by adding second stage switches and connecting each additional second stage switch to each first stage switch. In larger networks, the first and second stage switches are themselves replaceable by two-stage networks in accordance with the invention.

22 Claims, 16 Drawing Figures

| CONNECTION REQUEST | ASSIGNED SWITCHES |
|---|---|
| IC4 TO OC5 | B,E,H |
| IC1 TO OC1 | A,C,F |
| IC3 TO OC2 | B,D,F |
| IC1 TO OC3 | A,D,G |
| IC2 TO OC6 | BLOCKED |

| 1 | 2 | 3 | 4 | 5 |
| 6 | 7 | 8 | 9 | 10 |
| 11 | 12 | 13 | 14 | 15 |
| 16 | 17 | 18 | 19 | 20 |
| 21 | 22 | 23 | 24 | 25 |
| 1 | 22 | 18 | 14 | 10 |
| 6 | 2 | 23 | 19 | 15 |
| 11 | 7 | 3 | 24 | 20 |
| 16 | 12 | 8 | 4 | 25 |
| 21 | 17 | 13 | 9 | 5 |

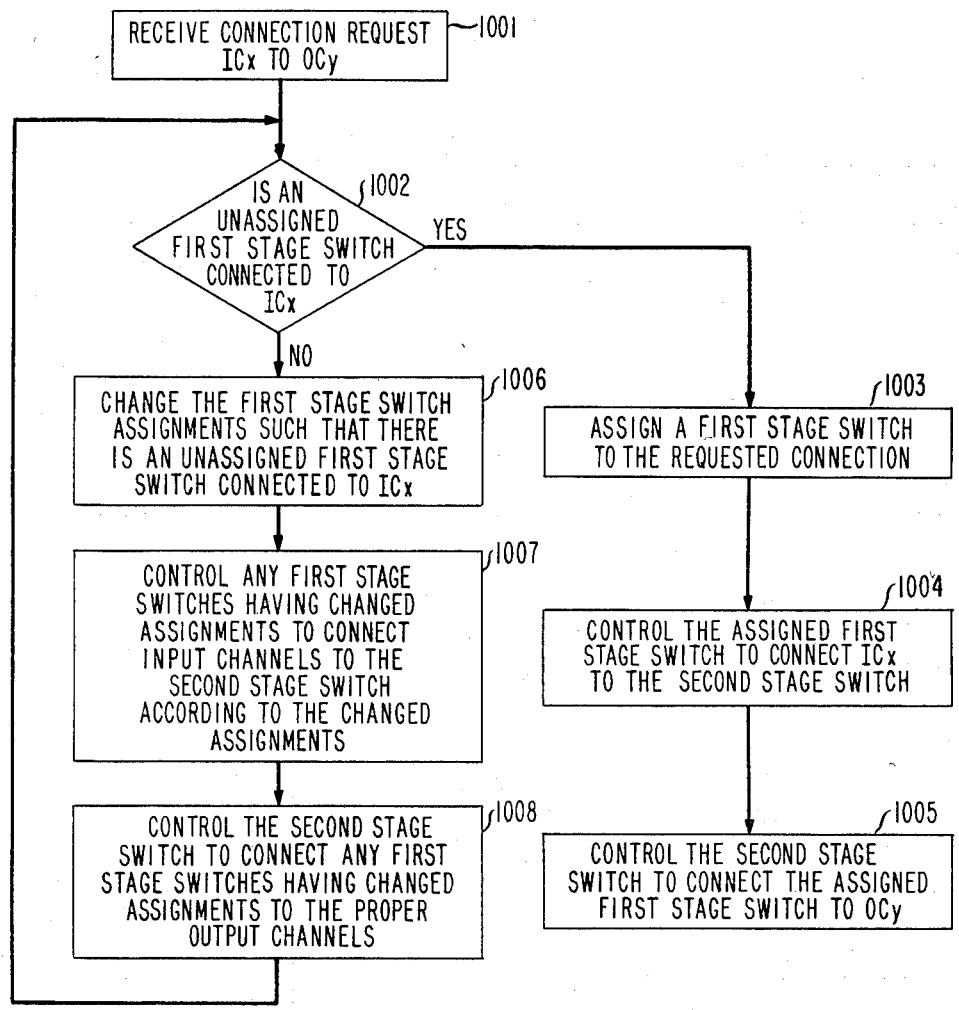

FIG. 11

| 1  | 2  | 3  | 4  | 5  | 6  | 7  |
|----|----|----|----|----|----|----|
| 8  | 9  | 10 | 11 | 12 | 13 | 14 |
| 15 | 16 | 17 | 18 | 19 | 20 | 21 |
| 22 | 23 | 24 | 25 | 26 | 27 | 28 |
| 29 | 30 | 31 | 32 | 33 | 34 | 35 |
| 36 | 37 | 38 | 39 | 40 | 41 | 42 |
| 43 | 44 | 45 | 46 | 47 | 48 | 49 |
| 1  | 44 | 38 | 32 | 26 | 20 | 14 |
| 8  | 2  | 45 | 39 | 33 | 27 | 21 |
| 15 | 9  | 3  | 46 | 40 | 34 | 28 |
| 22 | 16 | 10 | 4  | 47 | 41 | 35 |
| 29 | 23 | 17 | 11 | 5  | 48 | 42 |
| 36 | 30 | 24 | 18 | 12 | 6  | 49 |
| 43 | 37 | 31 | 25 | 19 | 13 | 7  |
| 1  | 37 | 24 | 11 | 47 | 34 | 21 |
| 8  | 44 | 31 | 18 | 5  | 41 | 28 |
| 15 | 2  | 38 | 25 | 12 | 48 | 35 |
| 22 | 9  | 45 | 32 | 19 | 6  | 42 |
| 29 | 16 | 3  | 39 | 26 | 13 | 49 |
| 36 | 23 | 10 | 46 | 33 | 20 | 7  |
| 43 | 30 | 17 | 4  | 40 | 27 | 14 |

FIG. 13

| 1  | 2  | 3  | 4  | 5  |
|----|----|----|----|----|
| 6  | 7  | 8  | 9  | 10 |
| 11 | 12 | 13 | 14 | 15 |
| 16 | 17 | 18 | 19 | 20 |
| 21 | 22 | 23 | 24 | 25 |
| 1  | 17 | 8  | 24 | 15 |
| 6  | 22 | 13 | 4  | 20 |
| 11 | 2  | 18 | 9  | 25 |
| 16 | 7  | 23 | 14 | 5  |
| 21 | 12 | 3  | 19 | 10 |

FIG. 14

| 1  | 2  | 3  | 4  | 5  |
|----|----|----|----|----|
| 6  | 7  | 8  | 9  | 10 |
| 11 | 12 | 13 | 14 | 15 |
| 16 | 17 | 18 | 19 | 20 |
| 21 | 22 | 23 | 24 | 25 |
| 1  | 12 | 23 | 9  | 20 |
| 6  | 17 | 3  | 14 | 25 |
| 11 | 22 | 8  | 19 | 5  |
| 16 | 2  | 13 | 24 | 10 |
| 21 | 7  | 18 | 4  | 15 |

FIG. 15

| 1  | 2  | 3  | 4  | 5  |
| -- | -- | -- | -- | -- |
| 6  | 7  | 8  | 9  | 10 |
| 11 | 12 | 13 | 14 | 15 |
| 16 | 17 | 18 | 19 | 20 |
| 21 | 22 | 23 | 24 | 25 |
| 1  | 7  | 13 | 19 | 25 |
| 6  | 12 | 18 | 24 | 5  |
| 11 | 17 | 23 | 4  | 10 |
| 16 | 22 | 3  | 9  | 15 |
| 21 | 2  | 8  | 14 | 20 |

FIG. 16

| 1  | 2  | 3  | 4  | 5  |
| -- | -- | -- | -- | -- |
| 6  | 7  | 8  | 9  | 10 |
| 11 | 12 | 13 | 14 | 15 |
| 16 | 17 | 18 | 19 | 20 |
| 21 | 22 | 23 | 24 | 25 |
| 1  | 6  | 11 | 16 | 21 |
| 2  | 7  | 12 | 17 | 22 |
| 3  | 8  | 13 | 18 | 23 |
| 4  | 9  | 14 | 19 | 24 |
| 5  | 10 | 15 | 20 | 25 |

REARRANGEABLE MULTICONNECTION SWITCHING NETWORKS

TECHNICAL FIELD

This invention relates to switching networks and, more particularly, to multiconnection, broadcast switching networks that are rearrangeable to avoid blocking and that require significantly fewer crosspoints than a conventional, rectangular crosspoint array.

BACKGROUND OF THE INVENTION

Switching systems such as the telephone switching network are generally designed as point-to-point networks to interconnect, upon request, selected pairs of customer terminals from a large plurality of terminals connected to the system. The simplest connecting network capable of interconnecting $N_1$ input terminals and $N_2$ output terminals is a rectangular $N_1 \times N_2$ array of switching elements or crosspoints. Although such a rectangular array is non-blocking in that any two idle customer terminals are always connectible regardless of the array interconnection of other terminals, the rectangular array is not a practical network in most applications due to the prohibitive cost of the large number of array crosspoints.

Significant crosspoint cost reductions are obtained by designing networks having small blocking probabilities determined to be acceptable in many applications. However, in other applications blocking networks are not acceptable. For example, customers that are provided with a large selection of video signals via a switching network might reasonably consider the network blocking of their favorite channels as unacceptable. At the same time, the crosspoint cost for such a high-frequency switching network becomes an even more important consideration.

One known non-blocking network having significantly fewer crosspoints than a rectangular array is disclosed in an article by C. Clos, "A Study of Non-Blocking Switching Networks," *Bell System Technical Journal*, March 1953, pages 406–424. The network, referred to herein as the three-stage Clos network, comprises $r_1$ rectangular $n_1 \times m$ first stage switches, m rectangular $r_1 \times r_2$ second stage switches and $r_2$ rectangular $m \times n_2$ third stage switches. There is exactly one link connecting each first stage switch to each second stage switch and one link connecting each second stage switch to each third stage switch. A three-stage Clos network wherein the number, m, of second stage switches is given by $$m = n_1 + n_2 - 1,$$

in a non-blocking, point-to-point network. This is true since a given first stage switch input terminal is always connectible to a given third stage switch output terminal via a second stage switch that is connected to none of the other $n_1 - 1$ input terminals of the given first stage switch and none of the other $n_2 - 1$ output terminals of the given third stage switch. However, a three-stage Clos network having the number, m, of second stage switches given by the above equation is not a non-blocking multiconnection network as is illustrated later herein by an example. The example involves a multiconnection network that is referred to as a broadcast network since any given network input terminal is connectible to any or all output terminals.

As is discussed in the article by F. K. Hwang, "Three-stage Multiconnection Networks Which Are Non-blocking in the Wide-Sense," *Bell System Technical Journal*, Vol. 58, no. 10, December 1979, pages 2183–2187, three-stage multiconnection Clos networks have been designed which are non-blocking in the wide sense, i.e., non-blocking when a particular connection strategy is followed, by providing a significantly increased number of second stage switches. Again, however, the large crosspoint cost associated with the increased number of second stage switches makes such a three-stage Clos multiconnection network an extremely expensive alternative for switching networks serving even a modest number of customer facilities.

It is possible for a customer facility connected to a multistage switching network to occasionally be blocked from being connected as desired because the network happens to be interconnected in a manner that prevents effecting the desired interconnection. This, of course, is an undesirable situation which, in an appropriately designed network, is remedied by dismantling one or more existing interconnections and rearranging the interconnection paths to accommodate the new request. When such a rearrangement is possible, it is said that the new assignment, which is the new set of interconnections desired to be established, is realizable. A switching network which can realize all possible assignments without rearranging existing connections is said to be non-blocking, while a network which can realize all possible assignments only by occasionally rearranging existing connections is said to be rearrangeable. Typical rearrangeable networks have many less crosspoints than their non-blocking counterparts. An illustrative rearrangeable network, along with the common control equipment associated therewith, is disclosed in U.S. Pat. No. 3,129,407 issued to M. C. Paull on Apr. 14, 1964. Other rearrangeable networks are disclosed in the article by V. E. Benes, "On Rearrangeable Three-Stage Connecting Networks," *Bell System Technical Journal*, Vol. 41, no. 5, September 1962, pages 1481–1492 and in U.S. Pat. No. 4,038,638 issued to F. K. Hwang on July 26, 1977. Each of these known switching networks is, however, a rearrangeable point-to-point network rather than a rearrangeable multiconnection network. Further, each of these networks comprises three or more stages of switching. In applications where network distortion and delay parameters directly related to the number of crosspoints required to effect a given connection are important, the transmission quality obtainable through such three-stage networks is therefore limited.

In view of the foregoing, a recognized problem in the art is that costly multiconnection networks which are non-blocking without rearrangement must presently be used in applications where blocking is unacceptable and high transmission quality is required since the known rearrangeable networks are only point-to-point networks and comprise at least three switching stages.

SUMMARY OF THE INVENTION

The aforementioned problem is solved and a technical advance is achieved in accordance with the principles of the invention advantageously in a two-stage, multiconnection switching network having a departure in the art including an innovative connection arrangement that connects each network input channel to a multiplicity of first stage switch inlets in a predetermined pattern such that for any given assignment of input channels to the network output channels connected to a second stage switch, the network can always be arranged such that each input channel is connected by a different first stage switch to the second stage switch and therefore to the output channels which are assigned that input channel. Accordingly, the switching network is a rearrangeable multiconnection network that avoids blocking. The innovative connection pattern advantageously eliminates the need for additional stages of switching thereby reducing both the total number of network crosspoints and the number of crosspoints used to effect such interconnection.

A two-stage, rearrangeable multiconnection switching network in accordance with the invention is used to connect $N_1$ input channels to $n_2$ channels. The network comprises a number of first stage switches and a second stage switch, e.g., rectangular arrays. A single link connects a given first stage switch to the second stage switch. The second stage switch has $n_2$ outlets each connected to one of the $n_2$ output channels. A connection arrangement connects each of the first stage switch inlets to an associated predetermined input channel such that for any group of $n_2$ of the input channels, there is a group of $n_2$ of the first stage switches each having one inlet connected to a different one of that group of $n_2$ of the input channels. The connections within that group of $n_2$ of the first stage switches are always rearrangeable to connect a different one of the group of $n_2$ of the input channels to the second stage switch. The connections within the second stage switch are therefore also rearrangeable to connect those input channels to the group of $n_2$ of the output channels. Accordingly, the network is rearrangeable to avoid the blocking of connections from the group of $n_2$ of the input channels to the $n_2$ output channels. In addition, any given input channel is connectible to all of the $n_2$ output channels. Just as the known rearrangeable point-to-point switching networks require fewer crosspoints than their non-blocking counterparts, the number of crosspoints required to implement a rearrangeable, multiconnection network in accordance with the invention is substantially less than that for multiconnection networks that are non-blocking without rearrangement. The approach is easily extendible to switching networks serving any larger number, $N_2$, of output channels by adding second stage switches and connecting each additional second stage switch to each first stage switch. In larger networks, the first and second stage switches are themselves replaceable by two-stage networks in accordance with the invention to achieve further crosspoint cost reductions. Two-stage, rearrangeable multiconnection networks in accordance with the invention are also useable without modification in point-to-point applications.

In accordance with an illustrative embodiment of the present invention, each of the $N_1$ input channels is connected to M of the first stage switch inlets, M being a positive integer greater than one. For any pair of the $N_1$ input channels, no more than one of the first stage switches has a pair of inlets connected to that pair of input channels. The number, $N_1$, of input channels is the square of a positive integer greater than one. The number of first stage switches equals $M \cdot \sqrt{N_1}$. Each of the first stage switches has $\sqrt{N_1}$ inlets. Each of the input channels has a unique channel designation. The connection arrangement connects the first stage switch inlets to the $N_1$ input channels in accordance with a predetermined $M \cdot \sqrt{N_1} \times \sqrt{N_1}$ connection matrix. The channel designation of each of the input channels occurs exactly once in the first $\sqrt{N_1}$ rows of the matrix. A given channel designation occurring in a column c at a row r in the first $\sqrt{N_1}$ rows also occurs $M-1$ additional times in column c, at rows given by $$1 + (i - 1)\sqrt{N_1} + [r + c(i - 1) - i]_{mod} \sqrt{N_1}$$

for positive integers i from 2 through M. The channel designations occurring in a given row of the matrix define the input channels that are connected to the inlets of a given first stage switch associated with that given row.

DRAWING DESCRIPTION

FIG. 1 is a block diagram of a known three-stage Clos network;

FIG. 2 lists a sequence of connection requests and switch assignments for an example illustrating blocking in the network of FIG. 1;

FIG. 6 is a program flowchart used to describe the operation of a network controller included in the network of FIG. 3;

Figure 3:
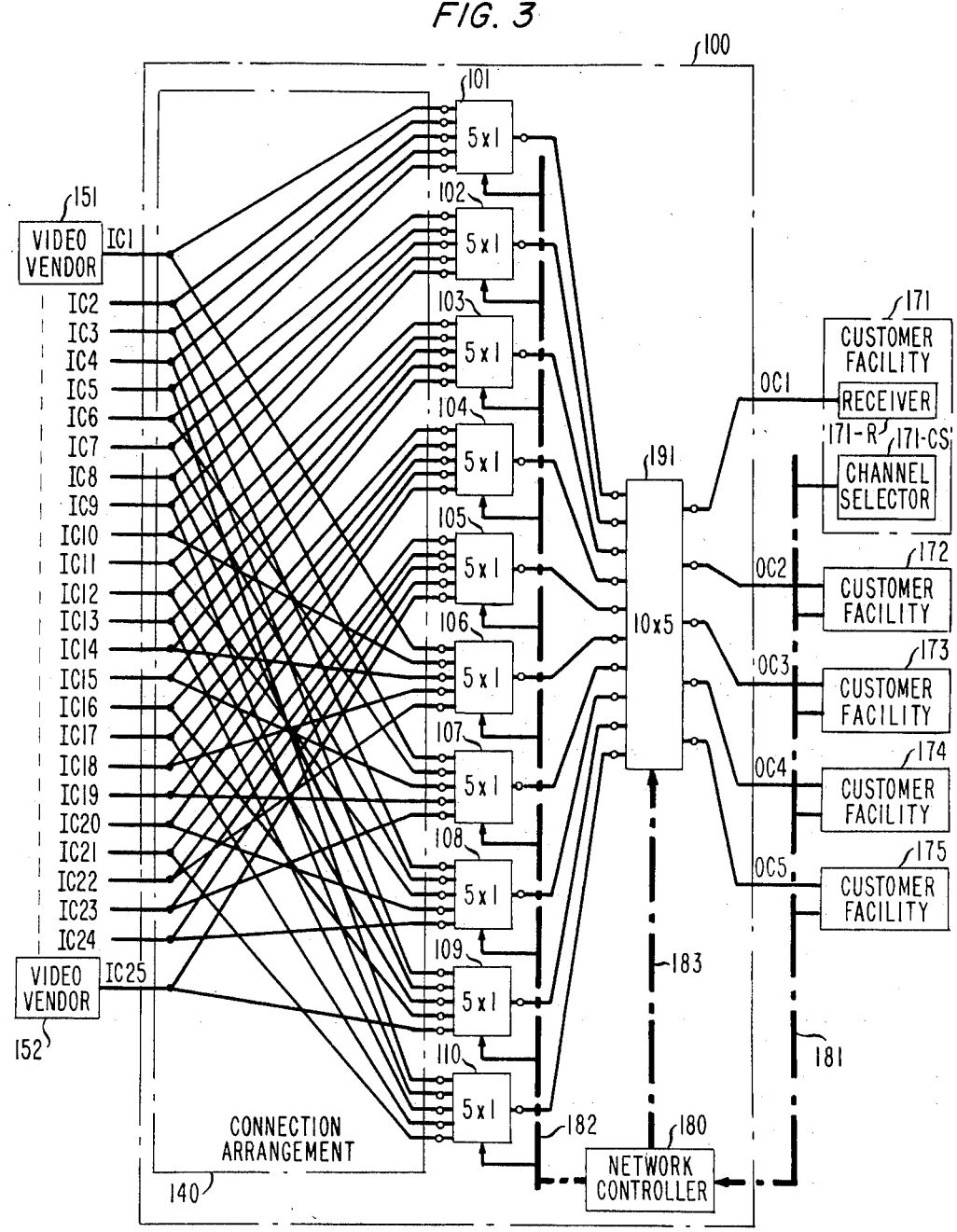
FIG. 3 is a block diagram of a first exemplary two-stage, rearrangeable broadcast network in accordance with the present invention.
Figures 4, 5:
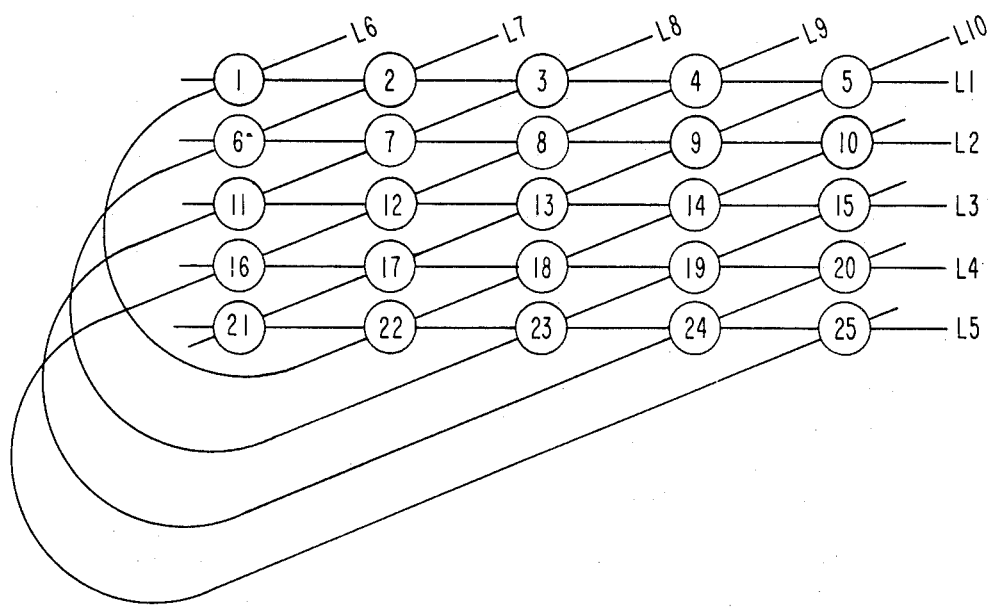
FIG. 4 shows a connection matrix defining the pattern of connections within an innovative connection arrangement included in the network of FIG. 3 to avoid blocking.
FIG. 5 is a diagram illustrating several important characteristics of the connection arrangement included in the network of FIG. 3.
Figure 8:
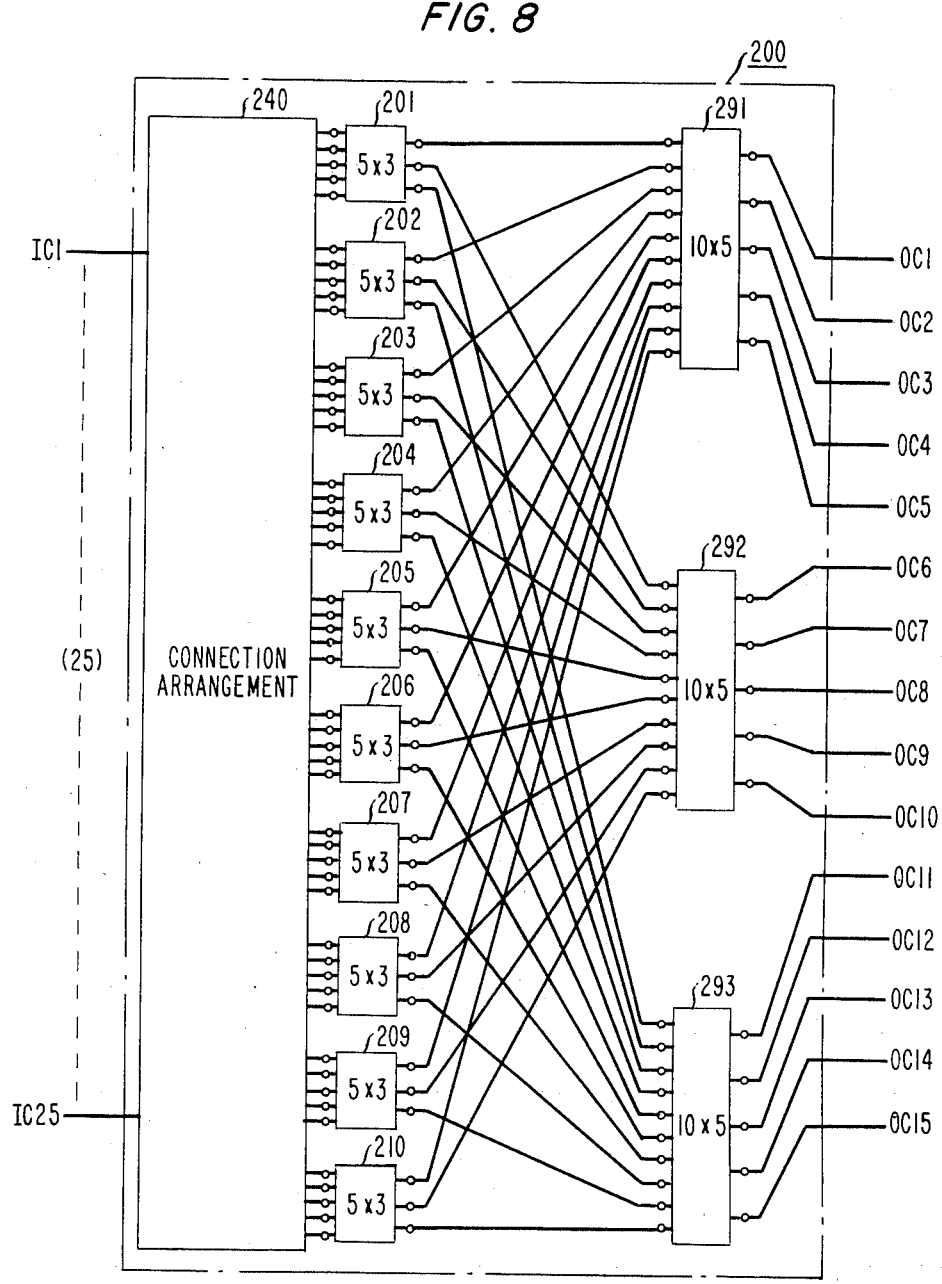
Figure 9:
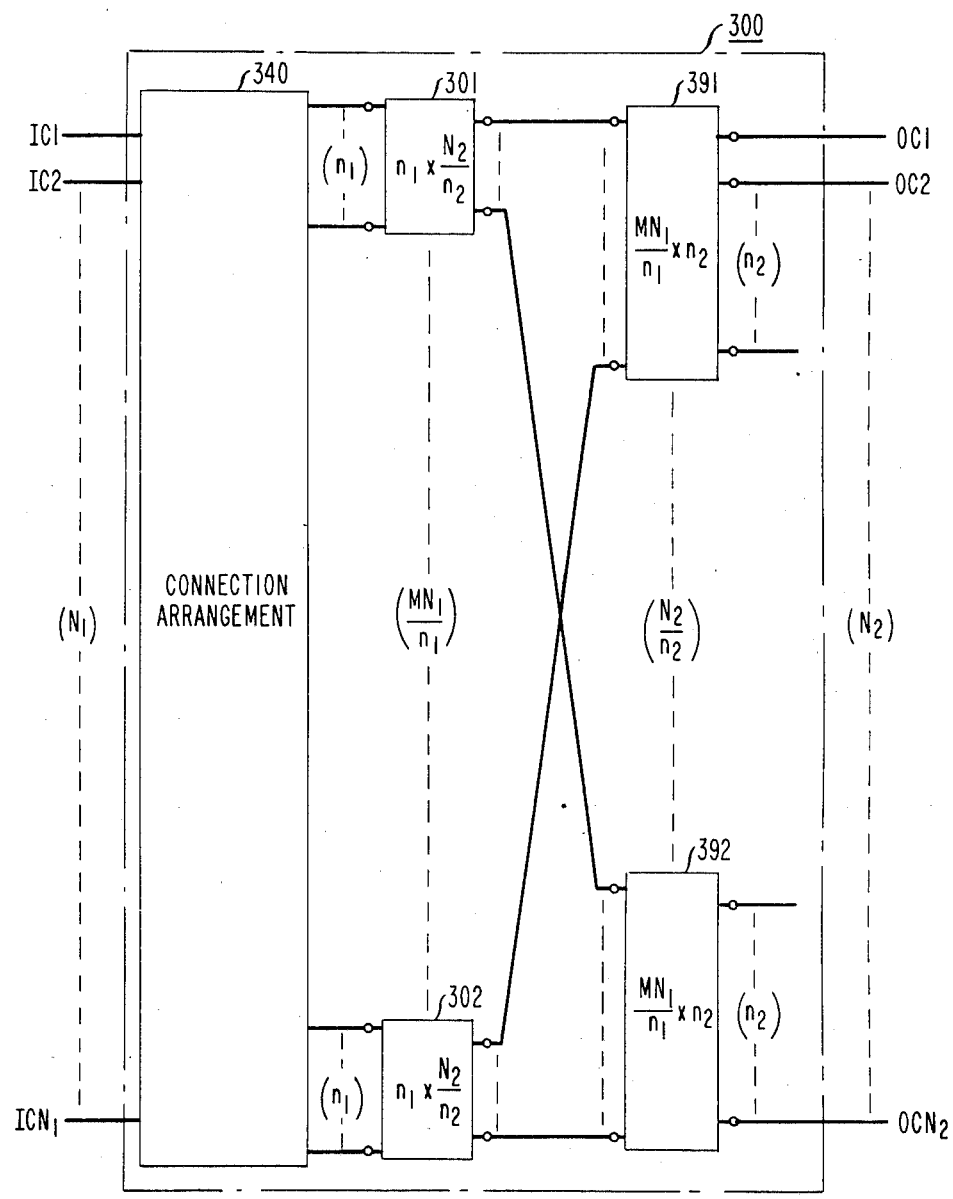
Figure 10:
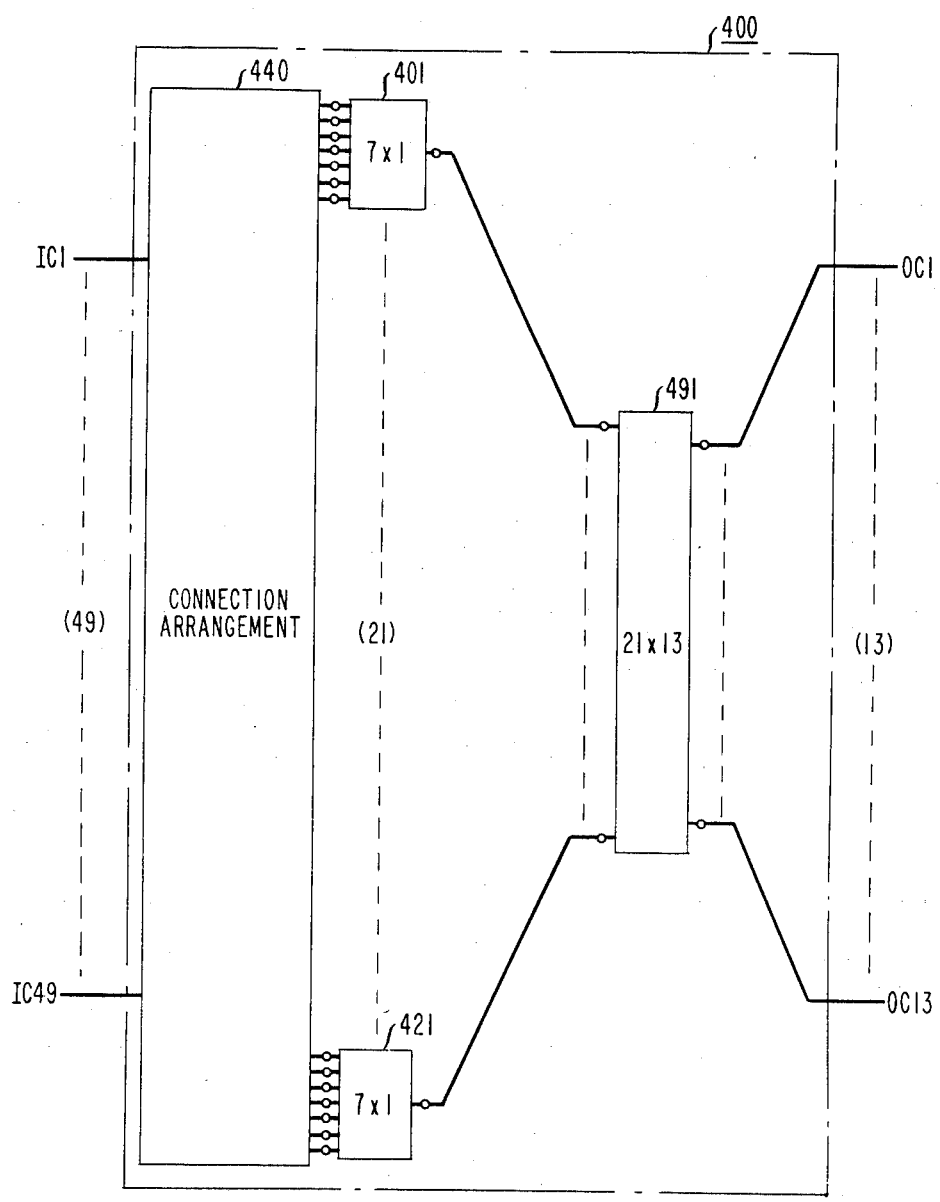
Figure 12:
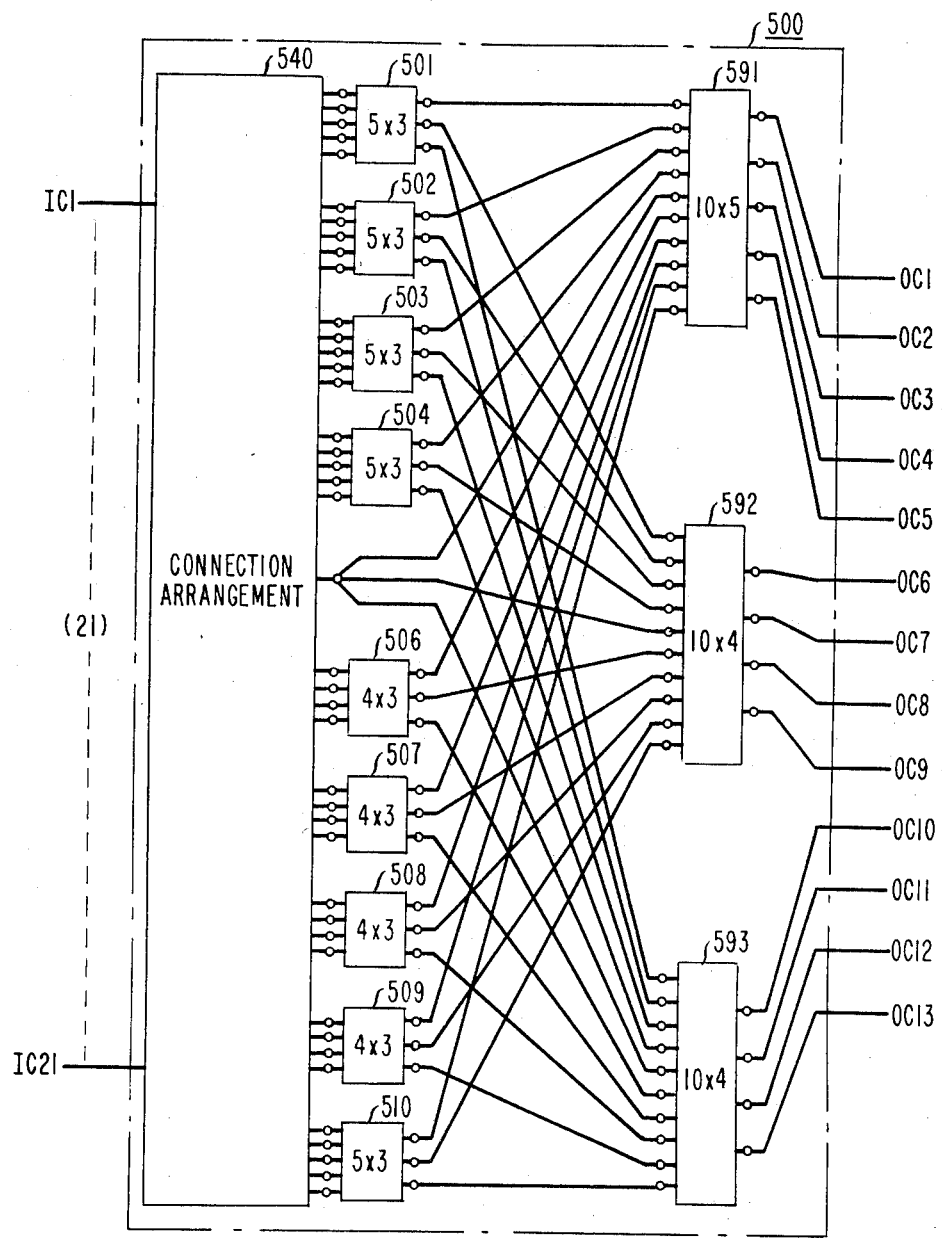

FIG. 7 lists a sequence of connection requests and switch assignments for an example illustrating rearrangement in the network of FIG. 3;

FIG. 8 is a block diagram of a second exemplary two-stage, rearrangeable broadcast network in accordance with the present invention;

FIG. 9 is a block diagram of a generalized, two-stage, rearrangeable broadcast network in accordance with the present invention;

FIG. 10 is a block diagram of a third exemplary two-stage, rearrangeable broadcast network in accordance with the present invention;

FIG. 11 shows a connection matrix defining the pattern of connections for the exemplary connection arrangement included in the network of FIG. 10 to avoid blocking;

FIG. 12 is a block diagram of a fourth exemplary two-stage, rearrangeable broadcast network in accordance with the present invention; and FIGS. 13 through 16 show four connection matrices each equivalent in certain defined respects to the connection matrix of FIG. 4.

DETAILED DESCRIPTION

Figures 1, 2:
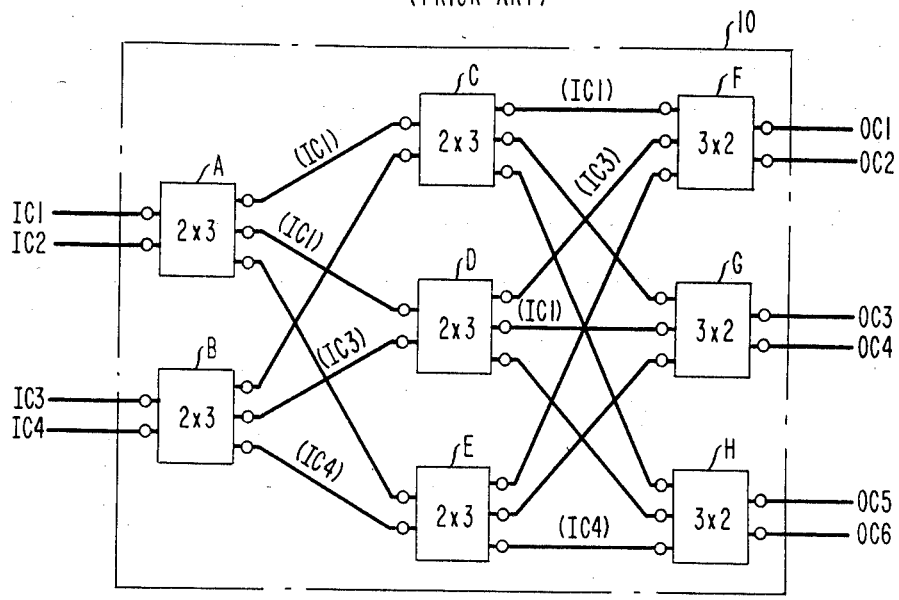

FIG. 1 is a block diagram of a known three-stage Clos network 10 used to interconnect four input channels IC1 through IC4 to six output channels OC1 through OC6. Network 10 includes two 2×3 rectangular first stage switches A and B, three 2×3 rectangular second stage switches C, D and E and three rectangular 3×2 third stage switches F, G and H. Network 10 is a non-blocking, point-to-point network since the number of second stage switches, three, is in accordance with the equation $$m = n_1 + n_2 - 1 \tag{1}$$

where m, $n_1$, and $n_2$ represent the number of second stage switches, the number of inlets of each first stage switch and the number of outlets of each third stage switch, respectively. However, network 10 is not a non-blocking, broadcast network as is illustrated by the following example. Assume that the four connection requests IC4 to OC5, IC1 to OC1, IC3 to OC2 and IC1 to OC3 occur in sequence and that the switch assignments made for each connection request are as given in FIG. 2. The example, the connection from IC4 to OC5 is made via first stage switch B, second stage switch E and third stage switch H. In FIG. 1, the input channels present on the inter-stage links after the four connections have been established are marked immediately above those links. With the network thus arranged, the connection request IC2 to OC6 occurs. Since the only available links from third stage switch H lead to the second stage switches C and D and the links from the first stage switch A to second stage switches C and D are unavailable, the connection of input channel IC2 to output channel OC6 is blocked. Accordingly, network 10 is not appropriate for applications requiring a non-blocking, broadcast network.

FIG. 3 is a block diagram of an exemplary two-stage, rearrangeable broadcast network 100 in accordance with the present invention. Network 100 is used to broadcast video signals from 25 video vendors, e.g., 151 and 152, to five customer facilities 171 through 175. Network 100 receives video signals in 25 input channels IC1 through IC25 and transmits video signals in five output channels OC1 through OC5 each connected to one of the customer facilities 171 through 175. Each of the customer facilities 171 through 175 includes a receiver, e.g., 171-R, for receiving the output channel video signals and a channel selector, e.g., 171-CS, which transmits connection requests via a communication path 181 to a network controller 180 included in network 100. The particular means whereby connection requests are transmitted from customer facilities 171 through 175 to network controller 180 is not relevant to the present invention. Accordingly, communication path 181 is merely illustrative.

Network 100 includes ten 5×1 first stage switches 101 through 110, each having five inlets and one outlet, and a single 10×5 second stage switch 191 having each of ten inlets connected to an associated one of the first stage switches 101 through 110 and having each of five outlets connected to one of the output channels OC1 through OC5. The 25 input channels IC1 through IC25 are connected to the 50 first stage switch inlets by a connection arrangement 140. Connection arrangement 140 connects each first stage switch inlet to an associated predetermined one of the input channels IC1 through IC25. Several observations can be made concerning the exemplary connection arrangement 140. First, each of the input channels IC1 through IC25 is connected to exactly two first stage switch inlets. Second, for any pair of the input channels IC1 through IC25, at most one of the first stage switches 101 through 110 has a pair of inlets connected to that pair of input channels. However, the most important characteristic of connection arrangement 140 can be stated as follows. For any group of five of the input channels IC1 through IC25, there is a group of five of the first stage switches 101 through 110 each having one inlet connected to a different one of that group of input channels. For example, consider the group of input channels IC1, IC5, IC9, IC21 and IC22. Each switch of the group of first stage switches 101, 102, 105, 106 and 110 has one inlet connected to a different one of that group of input channels. Switch 101 has an inlet connected to input channel IC5, switch 102 has an inlet connected to input channel IC9, switch 105 has an inlet connected to input channel IC22, switch 106 has an inlet connected to input channel IC1 and switch 110 has an inlet connected to input channel IC21. As will be demonstrated herein by an example, it is possible that for certain sequences of the customer facilities 171 through 175 transmitting connection requests for input channels IC1, IC5, IC9, IC21 and IC22, network 100 may temporarily block one or more of the requested input channels. However, it is always possible to rearrange the connections of the first stage switches such that switches 101, 102, 105, 106 and 110 connect input channels IC5, IC9, IC22, IC1 and IC21, respectively, to inlets of second stage switch 191. The connections within second stage switch 191 can then be rearranged such that the input channels IC5, IC9, IC22, IC1 and IC21 are connected to the customer facilities 171 through 175 in accordance with the connection requests. Since this is possible for any group of five of the input channels IC1 through IC25, network 100 is a rearrangeable broadcast network. In the present embodiment, the arrangement of connections within the ten first stages switches 101 through 110 and the second stage switch 191 is controlled by network controller 180 via two communication paths 182 and 183. Network 100 comprises 100 crosspoints in contrast to 125 crosspoints for a 25×5 rectangular array.

The connection pattern within connection arrangement 140 can be represented by a 10×5 connection matrix shown in FIG. 4. The numbers in each of the ten rows of the matrix are the designations of the ones of the input channels IC1 through IC25 connected by connection arrangement 140 to the inlets of the one of the first stage switches 101 through 110 associated with that row. For example, the numbers 1, 2, 3, 4 and 5 in the first matrix row indicate that connection arrangement 140 connects the five input channels IC1 through IC5 to the five inlets of first stage switch 101. The numbers 6, 7, 8, 9 and 10 in the second matrix row indicate that connection arrangement 140 connects the five input channels IC6 through IC10 to the five inlets of first stage switch 102, etc.

The truth of the statement that for any group of five of the input channels IC1 through IC25, there is a group of five of the first stage switches 101 through 110 each having one inlet connected to a different one of that group of five input channels can be better understood by a consideration of a diagram shown in FIG. 5 comprising ten lines L1 through L10 and 25 circles numbered 1 through 25. The ten lines L1 through L10 represent the ten first stage switches 101 through 110 and the 25 numbered circles represent the 25 input channels IC1 through IC25. Note that the 25 numbered circles are arranged in accordance with the first five rows of the connection matrix of FIG. 4. The lines L1 through L10 are drawn through the numbered circles to indicate the connection of input channels to first stage switch inlets. For example, line L1 drawn through the five circles numbered 1 through 5 indicates that input channels IC1 through IC5 are connected to switch 101. Line L8 drawn through the five circles numbered 3, 7, 11, 24 and 20 indicates that input channels IC3, IC7, IC11, IC24 and IC20 are connected to switch 108. First notice that each numbered circle is intersected by exactly two of the lines L1 through L10. Accordingly, each of the input channels IC1 through IC25 is connected to exactly two of the first stage switches 101 through 110. Second, notice that each pair of numbered circles is intersected by at most one of the lines L1 through L10. Accordingly, for any pair of the input channels IC1 through IC25, at most one of the first stage switches 101 through 110 has a pair of inlets connected to that pair of input channels. Finally, notice that it is impossible for any four of the lines L1 through L10 to intersect five numbered circles. Accordingly, any five of the input channels IC1 through IC25 are connected to at least five of the first stage switches 101 through 110. However, in a number of instances five of the lines L1 through L10 intersect six numbered circles. For example, the lines L1, L2, L7, L8 and L9 intersect at the six circles numbered 2, 3, 4, 6, 7 and 8. Accordingly, the six input channels IC2, IC3, IC4, IC6, IC7 and IC8 are connected to only five first stage switches 101, 102, 107, 108 and 109. This means that for certain groups of six input channels, there are no corresponding groups of six first stage switches each having one inlet connected to a different one of the group of six input channels. Therefore, five is the maximum number of output channels for network 100 to be a rearrangeable, broadcast network. However, the configuration is easily extendible to serve additional output channels as is described later herein.

The operation of network controller 180 (FIG. 3) in rearranging connections within first stage switches 101 through 110 and second stage switch 191 is described with reference to a program flow chart shown in FIG. 6. During block 1001, a connection request ICx to OCy is received by network controller 180 via communication path 181 from one of the customer facilities 171 through 175. In response to the connection request, execution proceeds to decision block 1002 during which a memory (not shown) included in network controller 180 is read to determine whether one of the first stage switches 101 through 110 connected by connection arrangement 140 to input channel ICx is presently unassigned. If such a first stage switch is unassigned, execution proceeds to block 1003 wherein that first stage switch is assigned to the requested connection ICx to OCy. Execution proceeds to block 1004 during which network controller 180 transmits signals via communication path 182 to the assigned first stage switch to connect input channel ICx to second stage switch 191. Execution then proceeds to block 1005 and network controller 180 transmits signals via communication path 183 to second stage switch 191 to connect the assigned first stage switch to output channel OCy.

If, however, it is determined during decision block 1002 that none of the first stage switches 101 through 110 connected by connection arrangement 140 to input channel ICx are presently unassigned, execution proceeds to block 1006 wherein the first stage switch assignments stored in the network controller 180 memory are changed such that there is an unassigned first stage switch connected to input channel ICx. This is always possible because of the advantageous pattern of connections within connection arrangement 140. Execution then proceeds to block 1007 during which network controller 180 transmits signals via communication path 182 to any first stage switches having changed assignments to connect input channels to second stage switch 191 in accordance with the changed assignments. Execution then proceeds to block 1008 and network controller 180 transmits signals via communication path 183 to second stage switch 191 to connect any first stage switches having changed assignments to the proper output channels. Execution is then returned to decision block 1002 and, if the assignments were changed properly during block 1006, execution proceeds through blocks 1003, 1004 and 1005 as described above to connect input channel ICx to output channel OCy.

Consider the rearrangement example detailed in FIG. 7. Four connection requests IC9 to OC1, IC1 to OC2, IC22 to OC3, and IC21 to OC4 are received in sequence by network controller 180 (FIG. 3) via communication path 181 from customer facilities 171, 172, 173 and 174, respectively. First stage switches 102, 101, 105 and 110 are assigned sequentially to the requested connections. Customer facility 175 then transmits the connection request IC5 to OC5 via communication path 181 to network controller 180. First stage switches 101 and 110 are the two first stage switches connected by connection arrangement 140 to input channel IC5. Since switches 101 and 110 have both been previously assigned, the connection of input channel IC5 to output channel OC5 is temporarily blocked. However, switch 101 can be reassigned to the connection request IC5 to OC5 if switch 106, rather than switch 101, is assigned to the connection request IC1 to OC2. Such rearrangement is always possible in accordance with the present invention.

If the possible assignments for network 100 are limited such that the output channels OC1 through OC5 are only connectible to ten of the 25 input channels IC1 through IC25, network 100 is non-blocking in the wide sense, i.e., non-blocking when a particular connection strategy is followed. For example, assume that the possible assignments for network 100 are limited such that the output channels OC1 through OC5 are connectible to only the ten input channels IC1, IC6, IC11, IC16, IC21, IC22, IC2, IC7, IC12 and IC17 (the input channels having designations in the first two columns of the connection matrix of FIG. 4). Once the connections of the first stage switches are arranged such that first stage switches 101 through 110 respectively connect input channels IC1, IC6, IC11, IC16, IC21, IC22, IC2, IC7, IC12 and IC17 to second stage switch 191, network 100 is thereafter non-blocking for those ten input channels. It also follows that if those ten input channels are the most frequently requested of the 25 input channels, the need for network rearrangement is minimized.

FIG. 8 is a block diagram of a second exemplary two-stage, rearrangeable broadcast network 200 in accordance with the invention. Network 200 is used to interconnect 25 input channels IC1 through IC25 to 15 output channels OC1 through OC15. Network 200 is constructed by extending network 100 previously described. Connection arrangement 240 of network 200 is identical to connection arrangement 140 of network 100. (The internal connections of connection arrangement 240 are not shown in FIG. 8.) Ten first stage switches 201 through 210 are each 5×3 rectangular switches in contrast to the ten 5×1 first stage switches 101 through 110 of network 100. Further, network 200 includes three 10×5 rectangular second stage switches 291, 292 and 293 each identical to the one second stage switch 191 of network 100. Network 200 comprises 300 crosspoints in contrast to 375 crosspoints for a 25×15 rectangular array. The arrangement of network 200 is further extendible to serve much larger numbers of output channels. For example, such an extended network serving 150 output channels has ten 5×30 rectangular first stage switches and thirty 10×5 rectangular second stage switches. The network is a rearrangeable broadcast network due to the advantageous connection pattern within connection arrangement 240 since the five output channels from a given second stage switch are always connectible to any five input channels by network rearrangement, if necessary. The network serving 150 output channels comprises 3000 crosspoints in contrast to 3750 for a 25×150 rectangular array. Advantageously, the network rearrangement required in network 200 in response to a given connection request involves only a single second stage switch.

FIG. 9 is a block diagram of a generalized, two-stage broadcast network 300 in accordance with the present invention. Network 300 is used to broadcast signals from $N_1$ input channels IC1 through IC$N_1$ to $N_2$ output channels OC1 through OC$N_2$. Network 300 comprises $M \cdot N_1/n_1$ rectangular first stage switches, e.g., 301 and 302, each having $n_1$ inlets and $N_2/n_2$ outlets, and $N_2/n_2$ rectangular second stage switches, e.g., 391 and 392, each having $M \cdot N_1/n_1$ inlets and $n_2$ outlets. (Assume for now that $N_1/n_1$ and $N_2/n_2$ are both integers. As will be illustrated later, network 300 is only slightly modified if $N_1/n_1$ and $N_2/n_2$ are not integers.) For each of the first and second stage rectangular switches, each inlet can be connected to any or all outlets. Note that the number of outlets of each first stage switch is equal to the number of second stage switches. Further, the number of inlets of each second stage switch is equal to the number of first stage switches. Each first stage switch is connected to each second stage switch by a single link. Connection arrangement 340 connects each of the input channels IC1 through IC$N_1$ to exactly a multiplicity, M, of the $M \cdot N_1$ first stage switch inlets, where M is a positive integer greater than 1. Each of the $N_2$ second stage switch outlets is connected to one of the output channels OC1 through OC$N_2$.

The total number, Q, of crosspoints in network 300 is given by $$Q = N_1 \cdot N_2 [M(1/n_1 + 1/n_2)]. \quad (2)$$

Network 300 has fewer crosspoints than an $N_1 \times N_2$ rectangular array if the bracketed expression in equation (2) is less than unity.

For network 300 to be a rearrangeable broadcast network, connection arrangement 340 must connect the $N_1$ input channels IC1 through IC$N_1$ to the first stage switch inlets such that for any group of $n_2$ of the input channels, there is a group of $n_2$ of the first stage switches each having one inlet connected to a different one of that group of $n_2$ of the input channels.

One illustrative method for designing connection arrangement 340 for a given number, $N_1$, of input channels is now described. It is assumed that $N_1$ is the square of a prime number. (The connection arrangement 340 designed using the present method can then be used in applications having less than $N_1$ input channels by omitting unneeded connections.) Recall that for network 100 (FIG. 3) having a multiplicity of M=2, the maximum number of outlets of the second stage switch 191 for network 100 to be a rearrangeable broadcast network was $n_2=5$ as was demonstrated using the diagram of FIG. 5. An empirically determined relationship between the multiplicity M and the maximum value of $n_2$ for other values of M is given by Table 1.

TABLE 1

| M | Maximum Value of $n_2$ |
|---|---|
| 2 | 5 |
| 3 | 13 |
| 4 | 29 |
| 5 | 57 |
| 6 | 101 |
| 7 | 165 |
| 8 | 253 |

In accordance with the present illustrative method, the number, $n_1$, of inlets of each first stage switch is given by $$n_1 = \sqrt{N_1}. \quad (3)$$

Using the combined relationships of equation (3) and Table 1, the bracketed expression in equation (2) and therefore, the total number of network crosspoints, can be minimized with respect to the multiplicity M for any value of $N_1$. The results of such minimization for values of $N_1$ less than 1240 are given by Table 2.

TABLE 2

| Range of Values of $N_1$ | Best Choice of M |
|---|---|
| $N_1 < 35$ | 2 |
| $35 \leq N_1 < 116$ | 3 |
| $116 \leq N_1 < 397$ | 4 |
| $397 \leq N_1 < 1240$ | 5 |

The illustrative design method proceeds as follows. Given the value of $N_1$, select M in accordance with Table 2. (It should be noted that for M<4, the requirement that $N_1$ is the square of a prime number may be replaced by a requirement that $N_1$ is the square of any integer. Also note that the best choice of M is not greater than $\sqrt{N_1}$ for $N_1 > 3$.) Based on the selected value of M, determine $n_2$ from Table 1. Then construct an $M \cdot \sqrt{N_1} \times \sqrt{N_1}$ connection matrix as follows. Place the designations of the $N_1$ input channels arbitrarily in the first $\sqrt{N_1}$ matrix rows such that each designation appears exactly once. Each of the input channel designations is then placed in exactly M−1 locations of the remaining matrix rows. A given channel designation occurring in a column c at a row r in the first $\sqrt{N_1}$ rows also occurs M−1 additional times in column c, in rows given by $$\text{row} = 1 + (i-1)\sqrt{N_1} + [r + c(i-1) - 1]_{mod} \sqrt{N_1} \quad (4)$$

for positive integers i from 2 through M. The term $[r+c(i-1)-i] \mod \sqrt{N_1}$ in equation (4) is defined as the remainder of the division of $[r+c(i-1)-i]$ by $\sqrt{N_1}$. The channel designations occurring in a given row of the matrix define the input channels that are connected to the inlets of a given first stage switch associated with that given row.

The following example illustrates the method for $N_1 = 49$. Based on the value of $N_1$, the multiplicity M=3 is determined from Table 2. Then the value of $n_2 = 13$ is found for M=3 in Table 1. The 21×7 connection matrix shown in FIG. 11 is then constructed. The channel designations 1 through 49 are placed sequentially, for example, in the first seven rows of the matrix. The remaining 14 matrix rows are then completed using equation (4). A method of completing the remaining 14 matrix rows yielding the same resultant matrix is as follows. Repeat the designations 1, 8, 15, 22, 29, 36 and 43 occurring in column 1, rows 1 through 7 in column 1, rows 8 through 14. Repeat the designations 2, 9, 16, 23, 30, 37 and 44 occurring in column 2, rows 1 through 7 in column 2, rows 8 through 14 with corresponding designations shifted down one row (the designation 44 is then shifted up to row 8). Rows 8 through 14 of columns 3, 4, 5, 6 and 7 are then completed similarly only with row shifts of 2, 3, 4, 5 and 6 rows, respectively. Rows 15 through 21 are completed in a similar manner only with row shifts of 2, 4, 6, 8, 10 and 12 rows for columns 2, 3, 4, 5 and 6, respectively. Note that each designation occurs exactly three times in the matrix and that any given pair of designations occurs in at most one matrix row. For any group of 13 designations, there is a group of 13 matrix rows each having a different one of the group of 13 designations in that matrix row.

FIG. 10 is a block diagram of the two-stage, rearrangeable broadcast network 400 defined by the preceding exemplary design. Network 400 is used to broadcast signals received in 49 input channels IC1 through IC49 to 13 output channels OC1 through OC13. Network 400 includes 21, 7×1 first stage switches, e.g., 401 and 421, each having seven inlets and one outlet, and a single 21×13 rectangular second stage switch 491 having each of 21 inlets connected to an associated one of the first stage switches and having each of 13 outlets connected to one of the output channels OC1 through OC13. The 49 input channels IC1 through IC49 are connected to the 147 first stage switch inlets by a connection arrangement 440. Although the internal connections are not shown in FIG. 10, connection arrangement 440 connects each first stage switch inlet to an associated predetermined one of the input channels IC1 through IC49 in accordance with the connection matrix of FIG. 11. Each of the input channels IC1 through IC49 is connected to exactly three first stage switch inlets. For any pair of the input channels IC1 through IC49, at most one of the first stage switches has a pair of inlets connected to that pair of input channels. Further, for any group of 13 of the input channels IC1 through IC49 there is a group of 13 of the first stage switches each having one inlet connected to a different one of that group of 13 of the input channels. Network 400 comprises 420 crosspoints in contrast to 637 crosspoints for a 49×13 rectangular array.

The crosspoint reductions achieved are even more significant for networks serving larger numbers of input channels. For example, a network designed according to the exemplary design method for $N_1=289$, $M=4$, $n_2=29$, $n_1=17$ and $N_2=29$ has 68, 17×1 first stage switches and one 68×29 second stage switch. The network comprises 3128 crosspoints in contrast to 8381 crosspoints for a 289×29 rectangular array. A network designed according to the exemplary design method for $N_1=841$, $M=5$, $n_2=57$, $n_1=29$ and $N_2=57$ has 145, 29×1 first stage switches and one 145×57 second stage switch. The network comprises 12,470 crosspoints in contrast to 47,937 crosspoints for an 841×57 rectangular array.

A further crosspoint reduction is achieved in network 400 by replacing the 21×13 rectangular second stage switch 491 by a two-stage rearrangeable broadcast network 500 (FIG. 12) in accordance with the present invention. Network 500 also illustrates the modifications that are made whd $N_1$ is not the square of an integer and $N_1$ and $N_2$ are not multiples of $n_1$ and $n_2$, respectively. Network 500 is substantially identical to network 200 (FIG. 8), which was designed for $N_1=25$, but network 500 has certain unneeded connections and crosspoints omitted. For example, connection arrangement 540 is identical to connection arrangement 240 (FIG. 8) as defined by the connection matrix of FIG. 4 except that the connections from the four input channels IC22 through IC25 are omitted. Since first stage switch 205 in network 200 is connected to the five input channels IC21 through IC25, and since input channels IC22 through IC25 are not present in network 500, no equivalent of first stage switch 205 is needed in network 500 and input channel IC21 is connected directly to each of three second stage switches 591, 592 and 593. Network 500 includes nine first stage switches 501 through 504 and 506 through 510. First stage switches 501 through 504 and 510 are each 5×3 rectangular arrays but first stage switches 506 through 509 are only 4×3 rectangular arrays. Further, since only 13 output channels are served by network 500, only second stage switch 591 is a 10×5 rectangular array and second stage switches 592 and 593 are each 10×4 rectangular arrays. Network 500 comprises 253 crosspoints in contrast to 273 crosspoints for a 21×13 rectangular array.

It is to be understood that the above-described embodiments are merely illustrative of the principles of the invention and that other embodiments may be devised by those skilled in the art without departing from the spirit and scope of the invention. For example, it is emphasized that the connection matrix generated by the above-described method is only exemplary. For each such connection matrix, a number of connection matrices exist that are equivalent thereto in that for any group of $n_2$ input channel designations, there is a group of $n_2$ rows in that matrix each having a different one of the group of $n_2$ input channel designations in that matrix row. For example, the connection matrices shown in FIG. 13 through 16 are each equivalent to the connection matrix of FIG. 4 in that for each such matrix and for any group of five input channel designations, there is a group of five rows in that matrix each having a different one of the group of five input channel designations in that matrix row. Also recall that in accordance with the exemplary design method, each input channel designation is placed in one location of the first $\sqrt{N_1}$ matrix rows but that the positioning of the designations in those $\sqrt{N_1}$ matrix rows is arbitrary. Further, the positioning of designations within any given matrix row is also arbitrary.

What is claimed is:

1. A switching network for selectively connecting $N_1$ input channels to $n_2$ output channels, $N_1$ and $n_2$ being positive integers, $n_2$ being at most equal to $N_1$, said switching network comprising a plurality of first stage switches each having a plurality of inlets and at least one outlet and each comprising means for selectively connecting any one of the inlets of that first stage switch to the at least one outlet of that first stage switch, the number of said plurality of first stage switches being at least equal to $n_2$, a second stage switch having $n_2$ outlets each connected to a different one of said output channels and having a plurality of inlets each associated with a different one of said plurality of first stage switches and each being connected to the at least one outlet of the associated first stage switch, said second stage switch comprising means for selectively connecting said outlets of said second stage switch to said inlets of said second stage switch and connection means for connecting each of said inlets of said plurality of first stage switches to an associated predetermined one of said input channels such that for any group of $n_2$ of said input channels, there is a group of $n_2$ of said first stage switches each having one inlet connected to a different one of that group of $n_2$ of said input channels, and where no two inlets of a single first stage switch are connected to the same input channel.

2. A switching network in accordance with claim 1 wherein each of said input channels is connected to M of said inlets of said plurality of first stage switches, M being a positive integer greater than one.

3. A switching network in accordance with claim 2 wherein for any pair of said input channels, at most one of said plurality of first stage switches has a pair of inlets connected to that pair of said input channels.

4. A switching network in accordance with claim 3 wherein $N_1$ is the square of a positive integer greater than one, wherein said number of said plurality of first stage switches equals $M \cdot \sqrt{N_1}$, wherein each of said plurality of first stage switches has $\sqrt{N_1}$ inlets, wherein each of said input channels has a unique channel designation, and wherein said connection means connects said inlets of said plurality of first stage switches to said input channels in accordance with a predetermined $M \cdot \sqrt{N_1} \times \sqrt{N_1}$ connection matrix having the channel designation of each of said input channels occur exactly once in the first $\sqrt{N_1}$ rows of said matrix, having a given channel designation occurring in a column c at a row r of said first $\sqrt{N_1}$ rows also occur $M-1$ additional times in column c, in rows given by $$1 + (i - 1)\sqrt{N_1} + [r + c(i - 1) - i]_{mod} \sqrt{N_1}$$

for positive integers i from 2 through M, and having the channel designations occurring in a given row of said matrix define the ones of said input channels connected to the inlets of a given first stage switch associated with said given row.

5. A switching network in accordance with claim 4 wherein $N_1$ is the square of a prime number.

6. A switching network in accordance with claim 3 further comprising
means for generating a request to connect a given input channel to at least one of said output channels and
means, responsive to said request, for rearranging said second stage switch and at least one of said plurality of first stage switches, when each of the first stage switches having an inlet associated with said given input channel is arranged such that an inlet other than said inlet associated with said given input channel, is connected to the at least one outlet of that first stage switch.

7. A switching network in accordance with claim 1 wherein for any pair of said input channels, at most one of said plurality of first stage switches has a pair of inlets connected to that pair of said input channels.

8. A switching network in accordance with claim 1 further comprising
means for generating a request to connect a given input channel to at least one of said output channels and
means, responsive to said request, for rearranging said second stage switch and at least one of said plurality of first stage switches, when each of the first stage switches having an inlet associated with said given input channel is arranged such that an inlet other than said inlet associated with said given input channel, is connected to the at least one outlet of that first stage switch.

9. A switching network for selectively connecting $N_1$ input channels to $n_2$ output channels, $N_1$ and $n_2$ being positive integers, $n_2$ being at most equal to $N_1$, said switching network comprising
a plurality of first stage switches each having a plurality of inlets and at least one outlet and each comprising means for selectively connecting any one of the inlets of that first stage switch to the at least one outlet of that first stage switch, the number of said plurality of first stage switches being at least equal to $n_2$ and each of said inlets of said plurality of first stage switches being connected to an associated predetermined one of said input channels such that for any group of $n_2$ of said input channels, there is a group of $n_2$ of said first stage switches each having one inlet connected to a different one of that group of $n_2$ of said input channels, and where no two inlets of a single first stage switch are connected to the same input channel, and
a second stage switch having $n_2$ outlets each connected to a different one of said output channels and having a plurality of inlets each associated with a different one of said plurality of first stage switches and each being connected to the at least one outlet of the associated first stage switch, said second stage switch comprising means for selectively connecting said outlets of said second stage switch to said inlets of said second stage switch.

10. A switching network in accordance with claim 9 wherein each of said input channels is connected to M of said inlets of said plurality of first stage switches, M being a positive integer greater than one.

11. A switching network in accordance with claim 10 wherein for any pair of said input channels, at most one of said plurality of first stage switches has a pair of inlets connected to that pair of said input channels.

12. A switching network in accordance with claim 11 further comprising
means for generating a request to connect a given input channel to at least one of said output channels and
means, responsive to said request, for rearranging said second stage switch and at least one of said plurality of first stage switches, when each of the first stage switches having an inlet associated with said given input channel is arranged such that an inlet other than said inlet associated with said given input channel, is connected to the at least one outlet of that first stage switch.

13. A switching network in accordance with claim 9 wherein for any pair of said input channels, at most one of said plurality of first stage switches has a pair of inlets connected to that pair of said input channels.

14. A switching network in accordance with claim 9 further comprising means for generating a request to connect a given input channel to at least one of said output channels and means, responsive to said request, for rearranging said second stage switch and at least one of said plurality of first stage switches, when each of the first stage switches having an inlet associated with said given input channel is arranged such that an inlet other than said inlet associated with said given input channel, is connected to the at least one outlet of that first stage switch.

15. A switching network for selectively connecting $N_1$ input channels to $N_2$ output channels, $N_1$ and $N_2$ being positive integers, said switching network comprising a plurality of first stage switches each having a plurality of inlets and a plurality of outlets and each comprising means for selectively connecting the outlets of that first stage switch to the inlets of that first stage switch, the number of said plurality of first stage switches being at least equal to a positive integer, $n_2$, that is less than $N_2$ and at most equal to $N_1$, a plurality of second stage switches each having $n_2$ outlets that are each connected to a different one of said output channels and having a plurality of inlets each associated with a different one of said plurality of first stage switches and each being connected to one of the outlets of the associated first stage switch, each of said plurality of second stage switches comprising means for selectively connecting the outlets of that second stage switch to the inlets of that second stage switch and connection means for connecting each of said inlets of said plurality of first stage switches to an associated predetermined one of said input channels such that for any group of $n_2$ of said input channels, there is a group of $n_2$ of said first stage switches each having one inlet connected to a different one of that group of $n_2$ of said input channels, and where no two inlets of a single first stage switch are connected to the same input channel.

16. A switching network in accordance with claim 15 wherein each of said input channels is connected to M of said inlets of said plurality of first stage switches, M being a positive integer greater than one.

17. A switching network in accordance with claim 16 wherein for any pair of said input channels, at most one of said plurality of first stage switches has a pair of inlets connected to that pair of said input channels.

18. A switching network in accordance with claim 17 further comprising means for generating a request to connect a given input channel to at least one of the output channels connected to a given second stage switch and means, responsive to said request, for rearranging said given second stage switch and at least one of said plurality of first stage switches, when each of the first stage switches having an inlet associated with said given input channel is arranged such that an inlet other than said inlet associated with said given input channel, is connected to the one of the plurality of outlets of that first stage switch connected to the one of the plurality of inlets of said given second stage switch associated with that first stage switch.

19. A switching network in accordance with claim 18 wherein each switch of said pluralities of first and second stage switches comprises a rectangular array of crosspoints.

20. A switching network in accordance with claim 15 wherein for any pair of said input channels, at most one of said plurality of first stage switches has a pair of inlets connected to that pair of said input channels.

21. A switching network in accordance with claim 15 further comprising means for generating a request to connect a given input channel to at least one of the output channels connected to a given second stage switch and means, responsive to said request, for rearranging said given second stage switch and at least one of said plurality of first stage switches, when each of the first stage switches having an inlet associated with said given input channel is arranged such that an inlet other than said inlet associated with said given input channel, is connected to the one of the plurality of outlets of that first stage switch connected to the one of the plurality of inlets of said given second stage switch associated with that first stage switch.

22. A switching network in accordance with claim 15 wherein each switch of said pluralities of first and second stage switches comprises a rectangular array of crosspoints.

* * * * *